United States Patent
Wang

(10) Patent No.: US 10,863,167 B2
(45) Date of Patent: Dec. 8, 2020

(54) STEREOSCOPIC IMAGE PROJECTION DEVICE AND STEREOSCOPIC DISPLAY GLASSES

(71) Applicant: Appotronics Corporation Limited, Shenzhen (CN)

(72) Inventor: Zeqin Wang, Shenzhen (CN)

(73) Assignee: Appotronics Corporation Limited, Shenzhen (CN)

( * ) Notice: Subject to any disclaimer, the term of this patent is extended or adjusted under 35 U.S.C. 154(b) by 238 days.

(21) Appl. No.: 15/510,002

(22) PCT Filed: Aug. 19, 2015

(86) PCT No.: PCT/CN2015/087517
§ 371 (c)(1),
(2) Date: Mar. 9, 2017

(87) PCT Pub. No.: WO2016/037521
PCT Pub. Date: Mar. 17, 2016

(65) Prior Publication Data
US 2017/0264889 A1    Sep. 14, 2017

(30) Foreign Application Priority Data

Sep. 9, 2014 (CN) .......................... 2014 1 0454907

(51) Int. Cl.
*H04N 9/31* (2006.01)
*H04N 13/10* (2018.01)
(Continued)

(52) U.S. Cl.
CPC ......... *H04N 13/334* (2018.05); *H04N 9/3105* (2013.01); *H04N 9/3111* (2013.01);
(Continued)

(58) Field of Classification Search
CPC .. H04N 13/334; H04N 13/344; H04N 13/324; H04N 13/398; H04N 13/363; H04N 2213/008; H04N 9/3105; H04N 9/3111
See application file for complete search history.

(56) References Cited

U.S. PATENT DOCUMENTS 5,517,340 A * 5/1996 Doany ................. G02B 27/283
                                                                    348/742
7,001,021 B2   2/2006 Jorke
(Continued)

FOREIGN PATENT DOCUMENTS

CN    101331775 A    12/2008
CN    102279467 A    12/2011
(Continued)

OTHER PUBLICATIONS

International Search Report, dated Nov. 11, 2015, for International Application No. PCT/CN2015/087517, 4 pages.

*Primary Examiner* — Mulugeta Mengesha
*Assistant Examiner* — Alazar Tilahun
(74) *Attorney, Agent, or Firm* — Seed Intellectual Property Law Group LLP

(57) ABSTRACT

A stereoscopic image projection device and stereoscopic display glasses include a light source system for sequentially generating a first broad spectrum light and a second broad spectrum light; a light splitter for splitting the first broad spectrum light into a first wavelength light and a second wavelength light, each having different wavelengths, and splitting the second broad spectrum light into a third wavelength light and a fourth wavelength light, each having different wavelengths; and a controller for simultaneously controlling the first wavelength light to display a corresponding color in a left-eye image and the second wavelength light to display a corresponding color in a right-eye image, and simultaneously controlling the third wavelength (Continued)

light to display a corresponding color in the left-eye image and the fourth wavelength light to display a corresponding color in the right-eye image. At the same time, the left eye of a viewer can see the first wavelength light or the third wavelength light, and the right eye thereof can see the second wavelength light or the fourth wavelength light, such that the left and right eyes of the viewer simultaneously receive light rays, thus relieving fatigue to the eyes.

19 Claims, 6 Drawing Sheets

(51) Int. Cl.
*H04N 13/00* (2018.01)
*H04N 13/334* (2018.01)
*H04N 13/363* (2018.01)
*H04N 13/324* (2018.01)
*H04N 13/344* (2018.01)
*H04N 13/398* (2018.01)

(52) U.S. Cl.
CPC ......... *H04N 13/324* (2018.05); *H04N 13/344* (2018.05); *H04N 13/363* (2018.05); *H04N 13/398* (2018.05); *H04N 2213/008* (2013.01)

(56) References Cited

U.S. PATENT DOCUMENTS

| | | | | |
|---|---|---|---|---|
| 2007/0247709 | A1* | 10/2007 | Karakawa | G02B 27/2207 359/464 |
| 2009/0231697 | A1* | 9/2009 | Marcus | H04N 3/10 359/465 |
| 2013/0335458 | A1* | 12/2013 | Seo | G02B 30/23 345/690 |
| 2014/0071402 | A1* | 3/2014 | Endo | G02B 27/22 353/7 |
| 2014/0119003 | A1* | 5/2014 | Huang | H04N 9/3114 362/231 |

FOREIGN PATENT DOCUMENTS

| | | |
|---|---|---|
| CN | 102591131 A | 7/2012 |
| CN | 103428510 A | 12/2013 |
| CN | 103430555 A | 12/2013 |

\* cited by examiner and is incident on a light splitter 202 which splits it into red light, green light and blue light that is incident on the SLM 203, SLM 204 and SLM 205 to be modulated. After that, the light is incident on a color combiner 206, and then output by a projection lens 207 to be viewed by the right eye.

Time sequence diagrams of the images respectively viewed by the left eye Z and the right eye Y are shown in FIG. 3. As can be seen, during a same period of time, only one of the two eyes of a viewer can view light abruptly switching between brightness and darkness, thereby causing fatigue to the eyes.

STEREOSCOPIC IMAGE PROJECTION DEVICE AND STEREOSCOPIC DISPLAY GLASSES

BACKGROUND

Technical Field

The present disclosure relates to the field of optical technology, and particularly to a stereoscopic image projection device and stereoscopic display glasses.

Description of the Related Art

Currently, stereoscopic display technology has been widely used in movie theaters, home theaters and other places. With the development of the stereoscopic display technology, people's requirements for the fidelity of stereoscopic display are also getting higher and higher. Stereoscopic display technology utilizes a person's left and right eyes to receive different images respectively, and the person's brain to superimpose the images to form a stereoscopic image. In order to obtain different images for the left eye and right eye, when recording a stereoscopic image, two photographic devices are typically used to capture images for the left eye and the right eye. When viewing the stereoscopic images, a viewer need to wear appropriate glasses which make the left eye and right eye view the images respectively corresponding the left and right eye.

In recent years, a new stereoscopic technology has developed in which the three primary color light required in projection display, that is, RGB light are also divided for the left and right eye, i.e., into light with six dominant wavelengths. Though the light is still red, green or blue, the dominant wavelength changes. That is, red light entering a left eye and red light entering a right eye, green light entering the left eye and green light entering the right eye, and blue light entering the left eye and blue light entering the right eye have the same colors but different wavelength ranges. Therefore, light with different dominant wavelengths can be respectively received by the left eye and the right eye with glasses having a filtering function, thus the left eye and right eye can each receive light of three primary colors. As shown in FIG. 1a, P1, P3 and P5 represent spectrums of three primary colors of the left (or right) eye, P2, P4 and P6 represent spectrums of three primary colors of the right (or left) eye. As shown in FIG. 1b, 107 represents a transmission curve of a left-eye (or right-eye) lens of stereoscopic glasses. In this case, a color gamut space consisting of the three primary colors P1, P3 and P5 can only be seen by the left (or right) eye after being transmitted through the lens having the transmission curve 107, and a color gamut space consisting of the three primary colors P2, P4 and P6 can only be seen by the right (or left) eye after being transmitted through a lens having a transmission curve 108. The left-eye image and right-eye image are superimposed by the brain, and a stereoscopic effect is achieved.

Generally, the displaying principle of a display device applying such technology is shown in FIG. 2. Within a certain period of time, light to be viewed by the left eye, such as P1, P3 and P5, is emitted from a light source 201, and is incident on a light splitter 202 which splits it into red light, green light and blue light that are incident on an SLM (Spatial Light Modulator) 203, an SLM 204 and an SLM 205 to be modulated. After that, the light is incident on a color combiner 206, and then output by a projection lens 207 to be viewed by the left eye. In another period of time, a light to be viewed by the right eye, such as P2, P4 and P6, is emitted from the light source 201, and is incident on a light splitter 202 which splits it into red light, green light and blue

BRIEF SUMMARY

In view of this, the present disclosure provides a stereoscopic image projection device and stereoscopic display glasses, to solve the issue that only one of the two eyes of a viewer can view the light abruptly switching between brightness and darkness in a certain period of time, thereby causing fatigue to the eyes of the viewer.

In order to achieve the above objective, the present disclosure provides the following solutions.

In various embodiments, a stereoscopic image projection device includes:

a light source system, configured to sequentially generate a first broad spectrum light and a second broad spectrum light;

a light splitter, configured to split the first broad spectrum light into a first wavelength light and a second wavelength light, each having different wavelengths, and split the second broad spectrum light into a third wavelength light and a fourth wavelength light, each having different wavelengths; and a controller, configured to simultaneously control the first wavelength light to display a corresponding color in a left-eye image and the second wavelength light to display a corresponding color in a right-eye image, and simultaneously control the third wavelength light to display a corresponding color in the left-eye image and the fourth wavelength light to display a corresponding color in the right-eye image.

Preferably, the stereoscopic image projection device may further include:

a light modulator, configured to simultaneously modulate the first wavelength light displaying the corresponding color in the left-eye image and the second wavelength light displaying the corresponding color in the right-eye image, and simultaneously modulate the third wavelength light displaying the corresponding color in the left-eye image and the fourth wavelength light displaying the corresponding color in the right-eye image.

Preferably, the first wavelength light and the second wavelength light have the same color and different wavelength ranges, and the third wavelength light and the fourth wavelength light have the same color and different wavelength ranges.

Preferably, the light source system may include a solid-state light source and a wavelength converter; where the solid-state light source may include a first light source configured to emit an excitation light; and the wavelength converter may include at least two light-emitting regions in each of which a wavelength conversion material is provided, the light-emitting regions being sequentially arranged on a light path of the excitation light to absorb the excitation light and sequentially generate the first broad spectrum light and the second broad spectrum light.

Preferably, the light source system may further include a second light source configured to emit a fifth wavelength light and a third light source configured to emit a sixth wavelength light, where the fifth wavelength light and the sixth wavelength light have the same color and different wavelength ranges.

Preferably, the controller may be further configured to control the fifth wavelength light displaying a corresponding color in the left-eye image to enter a left eye and the sixth wavelength light displaying a corresponding color in the right-eye image to enter a right eye.

Preferably, the light splitter may include a first prism, a second prism and a third prism, where a first film layer may be arranged on an interface between the first prism and the second prism to sequentially transmit the fifth wavelength light or the sixth wavelength light to a respective light modulator, and a second film layer may be arranged on an interface between the second prism and the third prism to split the first broad spectrum light into the first wavelength light and the second wavelength light, each having different wavelengths, split the second broad spectrum light into the third wavelength light and the fourth wavelength light, each having different wavelengths, and transmit the first wavelength light, the second wavelength light, the third wavelength light and the fourth wavelength light to respective light modulators.

Preferably, the light modulator may include a first light modulator, a second light modulator and a third light modulator; where the first light modulator may be configured to sequentially modulate the fifth wavelength light and the sixth wavelength light;

the second light modulator may be configured to sequentially modulate the first wavelength light and the third wavelength light; and the third light modulator may be configured to sequentially modulate the second wavelength light and the fourth wavelength light.

Preferably, the first broad spectrum light may be a red light, the second broad spectrum light may be a green light, and the fifth wavelength light and the sixth wavelength light may be blue lights.

In various embodiments, a stereoscopic image projection device includes:

a light source system, configured to sequentially generate a first wavelength light, a second wavelength light, a third wavelength light and a fourth wavelength light; and a controller, configured to sequentially control the first wavelength light to display a corresponding color in a left-eye image and the second wavelength light to display a corresponding color in a right-eye image, and sequentially control the third wavelength light to display a corresponding color in the left-eye image and the fourth wavelength light to display a corresponding color in the right-eye image.

Preferably, the light source system may be further configured to generate a fifth wavelength light and a sixth wavelength light.

Preferably, the controller is further configured to sequentially control the fifth wavelength light to display a corresponding color in the left-eye image and the sixth wavelength light to display a corresponding color in the right-eye image.

Preferably, the stereoscopic image projection device may further include:

a light modulator configured to sequentially modulate the first wavelength light, the second wavelength light, the third wavelength light, the fourth wavelength light, the fifth wavelength light and the sixth wavelength light.

Preferably, the light source system may include a solid-state light source and a wavelength converter, where the solid-state light source may be configured to emit excitation light, and the wavelength converter may include at least six light-emitting regions in each of which a wavelength conversion material is provided, the light-emitting regions being sequentially arranged on a light path of the excitation light to absorb the excitation light and sequentially generate the first wavelength light, the second wavelength light, the third wavelength light, the fourth wavelength light, the fifth wavelength light and the sixth wavelength light.

Preferably, the first wavelength light and the second wavelength light have the same color and different wavelength ranges, the third wavelength light and the fourth wavelength light have the same color and different wavelength ranges, and the fifth wavelength light and the sixth wavelength light have the same color and different wavelength ranges.

Preferably, the first wavelength light and the fourth wavelength light have the same color and different wavelength ranges, the second wavelength light and the fifth wavelength light have the same color and different wavelength ranges, and the third wavelength light and the sixth wavelength light have the same color and different wavelength ranges.

Preferably, the light source system may include a solid-state light source and a color wheel, where the color wheel may include at least six regions, at least three of which may be configured to transmit P light and at least three of which may be configured to transmit S light, the P light containing three primary colors and the S light containing three primary colors.

In various embodiments, stereoscopic display glasses are provided. The stereoscopic display glasses are configured to display a stereoscopic image projected by the stereoscopic image projection device according to any one of the above embodiments.

As compared with the conventional technologies, the technical solutions according to the present disclosure have the following advantages.

In the stereoscopic image projection device and stereoscopic display glasses according to the present disclosure, a first broad spectrum light is split into a first wavelength light and a second wavelength light, and a second broad spectrum light is split into a third wavelength light and a fourth wavelength light. It is simultaneously controlled that the first wavelength light displays a corresponding color in a left-eye image and the second wavelength light displays a corresponding color in a right-eye image. And it is simultaneously controlled that the third wavelength light displays a corresponding color in the left-eye image and the fourth wavelength light displays a corresponding color in the right-eye image. At the same time, the left eye of the viewer can view the first wavelength light or the third wavelength light and the right eye of the viewer can view the second wavelength light or the fourth wavelength light. Therefore, the left and right eyes of the viewer can receive light rays simultaneously, thereby alleviating fatigue to the eyes.

In another stereoscopic image projection device and other stereoscopic display glasses according to the present disclosure, the first wavelength light, the second wavelength light, the third wavelength light and the fourth wavelength light are sequentially generated, a controller is configured to sequentially controls the first wavelength light to display a corresponding color in a left-eye image and the second wavelength light to display a corresponding color in a right-eye image, and sequentially control the third wavelength light to display a corresponding color in the left-eye image and the fourth wavelength light to display a corresponding color in the right-eye image. The stereoscopic image projection device according to the present disclosure firstly controls the first wavelength light displaying the corresponding color in the left-eye image to enter the left eye, and then controls the second wavelength light displaying the corresponding color in the right-eye image to enter the right eye, then controls the third wavelength light displaying the corresponding color in the left-eye image to enter the left eye, and next controls the fourth wavelength light displaying the corresponding color in the right-eye image to enter the right eye, thereby increasing a switching frequency of light viewed by the left or right eye of the viewer, and thus reducing fatigue to the eyes.

BRIEF DESCRIPTION OF THE SEVERAL VIEWS OF THE DRAWINGS

The drawings to be used in the description of the embodiments or the conventional technology will be described briefly as follows, so that the technical solutions according to the embodiments of the present disclosure or according to the conventional technology will become clearer. It is apparent that the drawings in the following description only illustrate some embodiments of the present disclosure. For those skilled in the art, other drawings may be obtained according to these drawings without any creative work.

DETAILED DESCRIPTION

The technical solution according to the embodiments of the present disclosure will be described clearly and completely as follows in conjunction with the drawings. It is apparent that the described embodiments are only some, rather than all of the embodiments according to the present disclosure. Any other embodiments obtained by those skilled in the art based on the embodiments in the present disclosure without any creative work fall in the scope of the present disclosure.

The light modulator according to the present disclosure includes, but is not limited to DMD (Digital Micro mirror Device), LCOS (Liquid Crystal On Silicon) and LCD (Liquid Crystal Display). In the present disclosure, for a convenient description, the following embodiments are described in a manner mainly taking DMD as the light modulator, which is not intended to limit the protection scope of the present disclosure. The LCOS or LCD is configured to modulate S light including three primary colors red, green and blue which enter the left eye, and modulate P light including three primary colors red, green and blue which enter the right eye.

First Embodiment

Figure 1A:
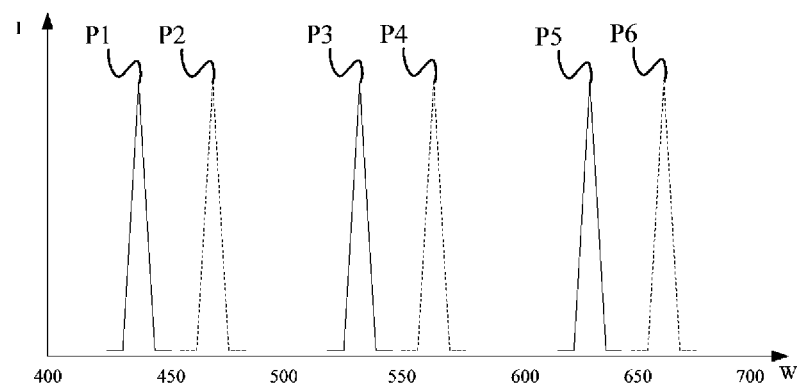
FIG. 1a is a waveform diagram of light rays entering left and right eyes in an existing stereoscopic image projection system.
Figure 1B:
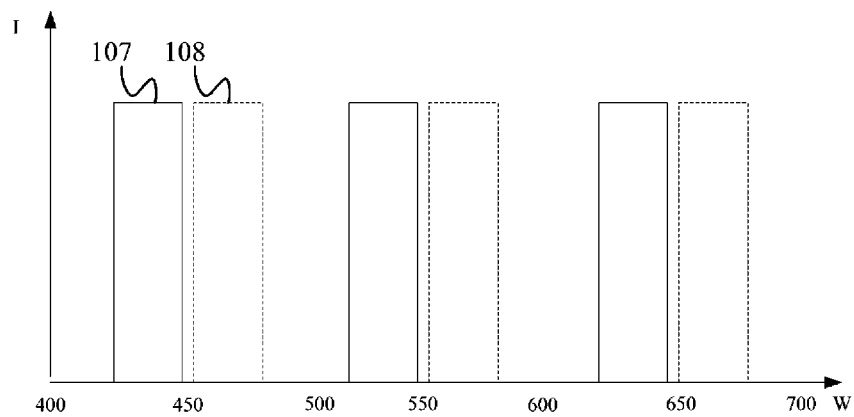
FIG. 1b shows transmission curves of left and right lenses of stereoscopic glasses matching with an existing stereoscopic image projection system.
Figure 2:
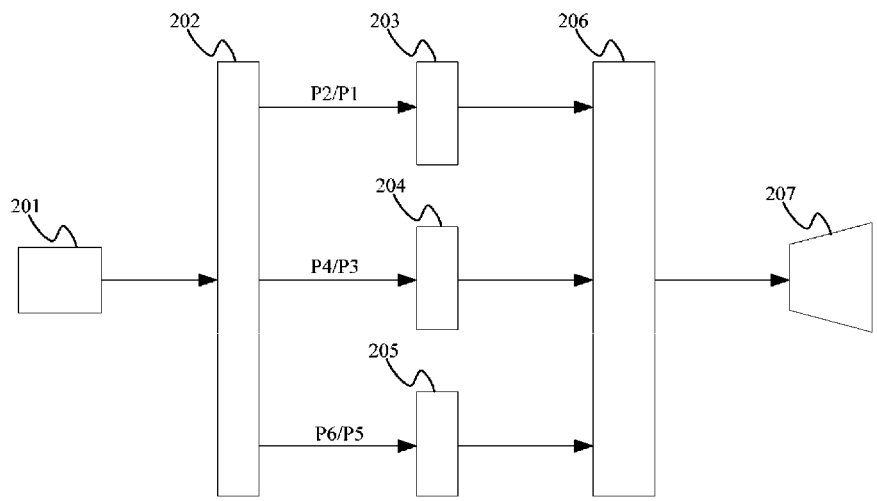
FIG. 2 is a schematic structural diagram of an existing stereoscopic image projection system.
Figure 3:
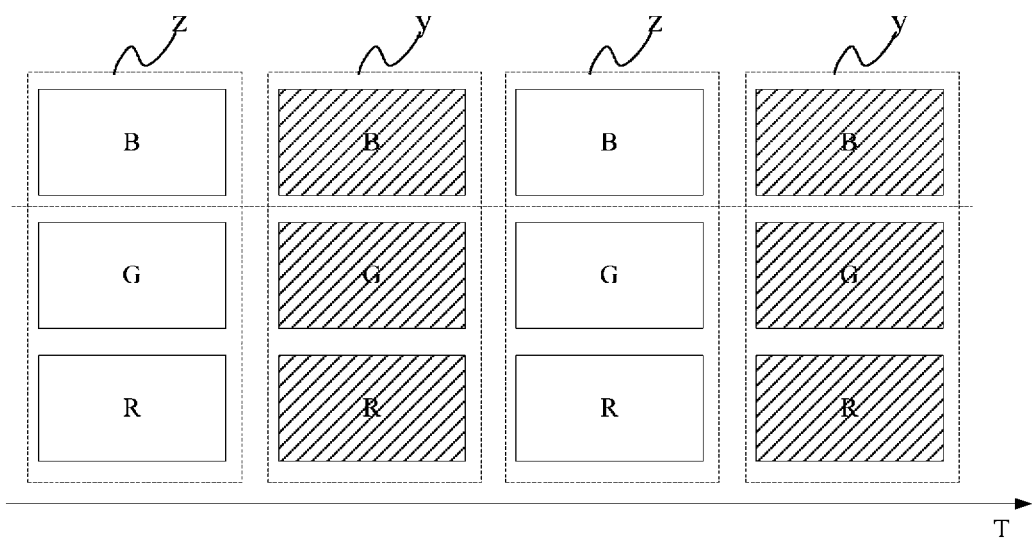
FIG. 3 is a time sequence diagram of images viewed by the left eye Z and the right eye Y in a conventional technology.
Figure 4:
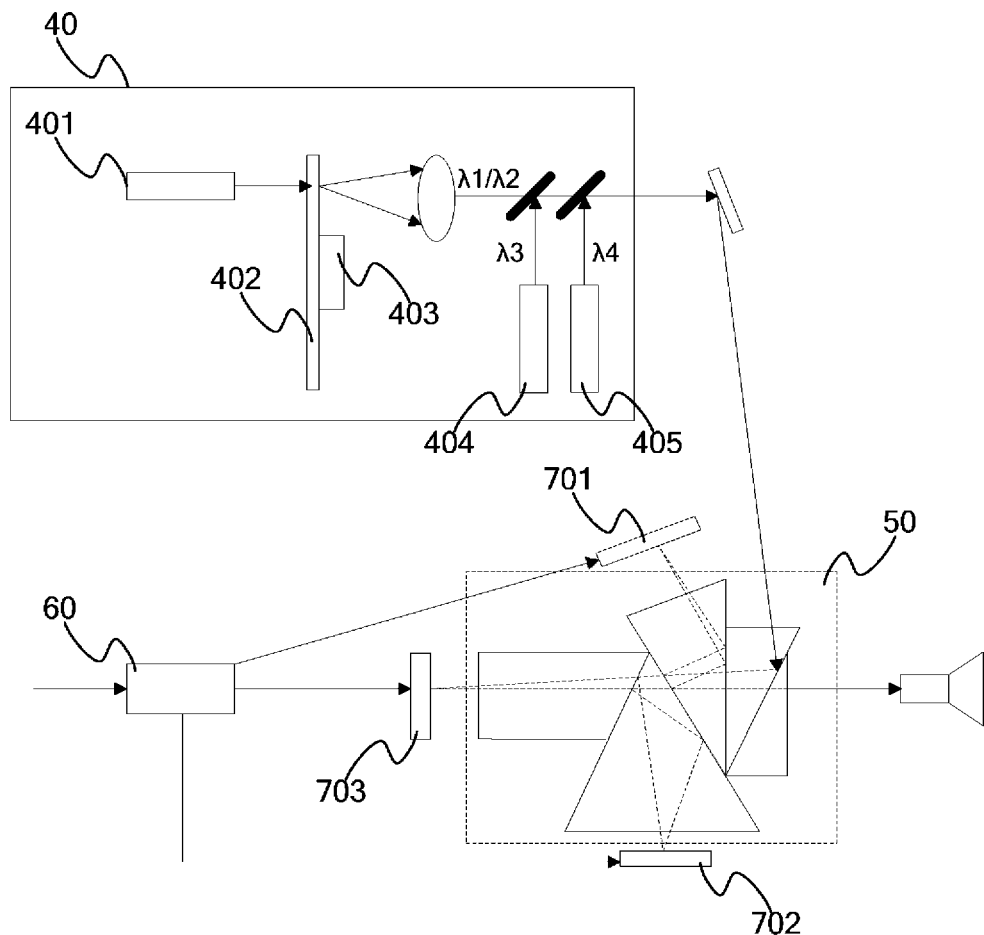
FIG. 4 is a schematic structural diagram of a stereoscopic image projection device according to a first embodiment of the present disclosure.

A stereoscopic image projection device is provided according to a first embodiment. As shown in FIG. 4, the stereoscopic image projection device includes a light source system 40, a light splitter 50, a controller 60 and a light modulator. The light modulator includes a first modulator 701, a second light modulator 702 and a third light modulator 703.

The light source system 40 is configured to sequentially generate a first broad spectrum light $\lambda 1$ and a second broad spectrum light $\lambda 2$, that is, to generate the first broad spectrum light $\lambda 1$ in a certain period of time and generate the second broad spectrum light $\lambda 2$ in another period of time. The light splitter 50 is configured to split the first broad spectrum light $\lambda 1$ into a first wavelength light $\lambda 10$ and a second wavelength light $\lambda 11$, each having different wavelengths, and split the second broad spectrum light $\lambda 2$ into a third wavelength light $\lambda 20$ and a fourth wavelength light $\lambda 21$, each having different wavelengths. The first wavelength light $\lambda 10$ and the second wavelength light $\lambda 11$ have the same color and different wavelength ranges, and the third wavelength light $\lambda 20$ and the fourth wavelength light $\lambda 21$ have the same color and different wavelength ranges.

The controller 60 is configured to simultaneously control the first wavelength light $\lambda 10$ to display a corresponding color in a left-eye image and the second wavelength light $\lambda 11$ to display a corresponding color in a right-eye image, and simultaneously control the third wavelength light $\lambda 20$ to display a corresponding color in the left-eye image and the fourth wavelength light $\lambda 21$ to display a corresponding color in the right-eye image. The light modulator is configured to simultaneously modulate the first wavelength light $\lambda 10$ displaying the corresponding color in the left-eye image and the second wavelength light $\lambda 11$ displaying the corresponding color in the right-eye image, and simultaneously modulate the third wavelength light $\lambda 20$ displaying the corresponding color in the left-eye image and the fourth wavelength light $\lambda 21$ displaying the corresponding color in the right-eye image.

Based on the above, with the stereoscopic image projection device according to the first embodiment, light rays can be simultaneously viewed by left and right eyes of a viewer.

Since three primary colors received by the left eye have dominant wavelengths different from that of three primary colors received by the right eye, and an image received by the left eye is different from that received by the right eye, after being received by the left and right eyes, the images are synthesized by the human brain to form a stereoscopic image. With this embodiment, the left eye and right eye can simultaneously receive light signals of images, thereby avoiding frequent switching between the left and right eyes, which not only harms the eyes but also causes fatigue to the eyes.

Specifically, the light source system 40 in this embodiment includes a solid-state light source and a wavelength converter. The solid-state light source includes a first light source 401 for emitting excitation light. The wavelength converter 402 has at least two light-emitting regions, in each of which a wavelength conversion material, i.e., phosphor, is provided. The wavelength converter 402 is configured to rotate when driven by a driver 403, such that the light-emitting regions are sequentially located on a light path of the excitation light, absorb the excitation light and sequentially generate the first broad spectrum light $\lambda 1$ and the second broad spectrum light $\lambda 2$. In the embodiment, the first broad spectrum light $\lambda 1$ is red light, and the second broad spectrum light $\lambda 2$ is green light. Of course, the present disclosure is not limited thereto. For example, in other embodiments, the first broad spectrum light may be a blue light and the second broad spectrum light may be a yellow light, and the blue light and the yellow light may be synthesized into white light for image display. For example, the light source system 40 may be further configured to sequentially generate a cyan light, a magenta and a yellow light. Of course, the light source system 40 may further generate white light for light compensation, such that an image can be displayed in a high brightness.

In the case that the first broad spectrum light $\lambda 1$ is a red light and the second broad spectrum light $\lambda 2$ is a green light, based on a three primary color principle, the light source system 40 may further include a second light source 404 for emitting a fifth wavelength light $\lambda 3$ and a third light source 405 for emitting a sixth wavelength light $\lambda 4$. The fifth wavelength light $\lambda 3$ and the sixth wavelength light $\lambda 4$ have the same color and different wavelength ranges, i.e., the fifth wavelength light $\lambda 3$ and the sixth wavelength light $\lambda 4$ are monochromatic lights with the same color and different dominant wavelengths. Preferably, the fifth wavelength light $\lambda 3$ and the sixth wavelength light $\lambda 4$ are blue lights. Each of the first light source 401, the second light source 404 and the third light source 405 include at least one laser or light-emitting diode.

Figure 5:
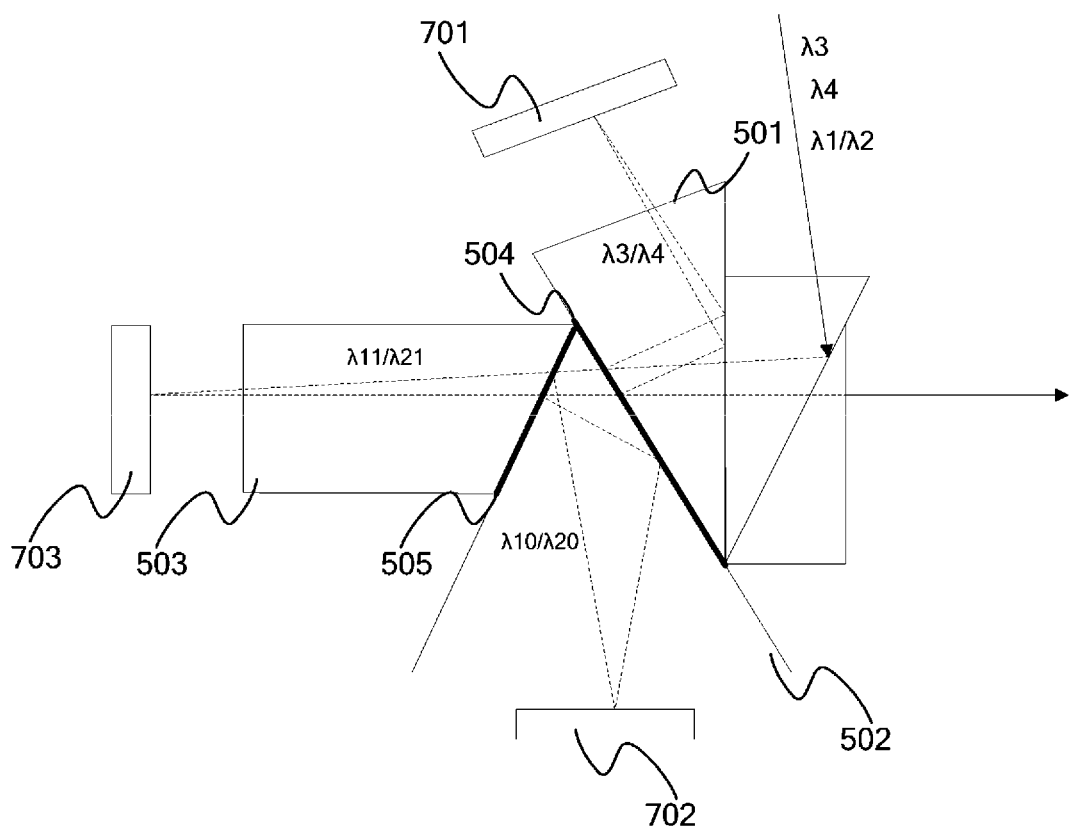
FIG. 5 is a schematic structural diagram of a light splitter according to the first embodiment of the present disclosure.

The light-splitter 50 contains a Philips prism structure. Of course, light-splitters with other structures may be adopted in other embodiments, therefore, the present disclosure is not limited thereto. In the embodiment, as shown in FIG. 5, the light-splitter 50 includes a first prism 501, a second prism 502 and a third prism 503. A first film layer 504 is arranged on an interface between the first prism 501 and the second prism 502 to sequentially transmit the fifth wavelength light $\lambda 3$ or the sixth wavelength light $\lambda 4$ to a corresponding light modulator. That is, as shown in FIG. 5, when the fifth wavelength light $\lambda 3$ or the sixth wavelength light $\lambda 4$ is sequentially incident on the first film layer 504, i.e., a reflection film, the first film layer 504 may reflect the light to a corresponding light modulator, that is, sequentially reflect the light to the first light modulator 701.

A second film layer 505 is arranged on an interface between the second prism 502 and the third prism 503 to split the first broad spectrum light $\lambda 1$ into the first wavelength light $\lambda 10$ and the second wavelength light $\lambda 11$ and split the second broad spectrum light $\lambda 2$ into the third wavelength light $\lambda 20$ and the fourth wavelength light $\lambda 21$, and transmit them to respective light modulators.

Figure 6:
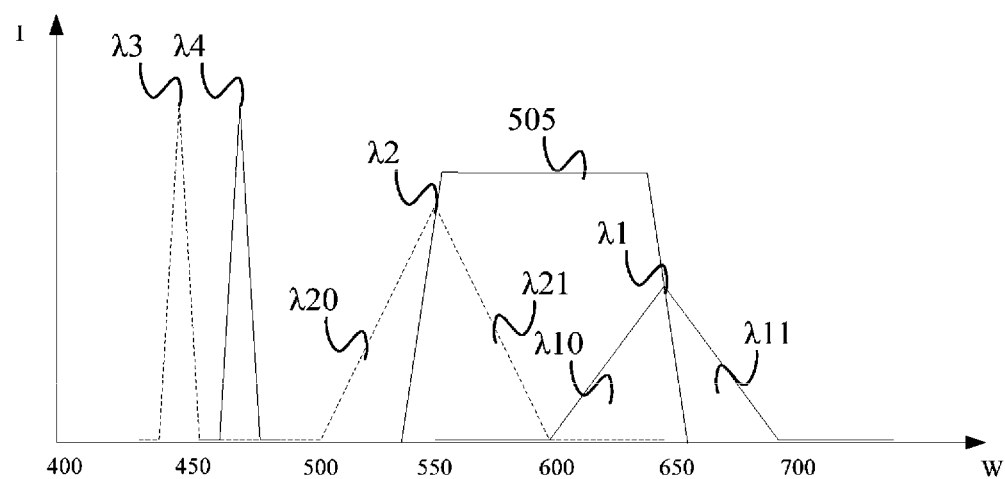
FIG. 6 is a waveform diagram of a first broad spectrum light $\lambda 1$ and a second broad spectrum light $\lambda 2$ according to the first embodiment of the present disclosure.

The second film layer 505 is a wavelength selective beam splitter film, which is capable of transmitting light in a certain wavelength range and reflect light in another wavelength range. For example, a waveform diagram of the first broad spectrum light $\lambda 1$ and the second broad spectrum light $\lambda 2$ is shown in FIG. 6. The light source system 40 sequentially generates a first broad spectrum light $\lambda 1$ with a wavelength range from 600 nm to 700 nm and a second broad spectrum light $\lambda 2$ with a wavelength range from 500 nm to 600 nm. The second film layer 505 splits, by reflection or transmission, the first broad spectrum light $\lambda 1$ into a first wavelength light $\lambda 10$ with a wavelength range from 600 nm to 650 nm and a second wavelength light $\lambda 11$ with a wavelength range from 650 nm to 700 nm, and splits the second broad spectrum light $\lambda 2$ into a third wavelength light $\lambda 20$ with a wavelength range from 500 nm to 550 nm and a fourth wavelength light $\lambda 21$ with a wavelength range from 550 nm to 600 nm. Of course, the above wavelength range division is only one embodiment, therefore the present disclosure is not limited thereto.

As shown in FIG. 5, the transmitted or reflected first wavelength light $\lambda 10$ enters the second light modulator 702, the transmitted or reflected second wavelength light $\lambda 11$ enters the third light modulator 703, the transmitted or reflected third wavelength light $\lambda 20$ enters the second light modulator 702, and the transmitted or reflected fourth wavelength light $\lambda 21$ enters the third light modulator 703.

In other words, in this embodiment, the first light modulator 701 sequentially modulates the fifth wavelength light $\lambda 3$ and the sixth wavelength light $\lambda 4$, the second light modulator 702 sequentially modulates the first wavelength light $\lambda 10$ and the third wavelength light $\lambda 20$, and the third light modulator 703 sequentially modulates the second wavelength light $\lambda 11$ and the fourth wavelength light $\lambda 21$.

In addition, the controller 60 obtains image sequences entering the left and right eyes frame by frame based on video or image data inputted into the projection system. Further, in this embodiment, the controller 60 controls the first wavelength light $\lambda 10$, i.e., red light, to display a corresponding color in a left-eye image while controlling the second wavelength light $\lambda 11$, i.e., red light, to enter the right eye to display a corresponding color in a right-eye image; controls the third wavelength light $\lambda 20$, i.e., green light, to enter the left eye to display a corresponding color in the left-eye image while controlling the fourth wavelength light $\lambda 21$, i.e., green light, to enter the right eye to display a corresponding color in the right-eye image; controls the fifth wavelength light $\lambda 3$, i.e., blue light, to enter the left eye to display a corresponding color in the left-eye image, and controls the sixth wavelength light $\lambda 4$, i.e., blue light, to enter the right eye to display a corresponding color in the right-eye image simultaneously or in a subsequent period of time. However, in this embodiment, due to the structure limitation of the light modulator and the light-splitter, preferably, the fifth wavelength light $\lambda 3$, i.e., blue light, is firstly controlled to enter the left eye to display the corresponding color in the left-eye image, and the sixth wavelength light $\lambda 4$, i.e., blue light, is controlled to enter the right eye to display the corresponding color in the right-eye image in a subsequent period of time.

Figure 7:
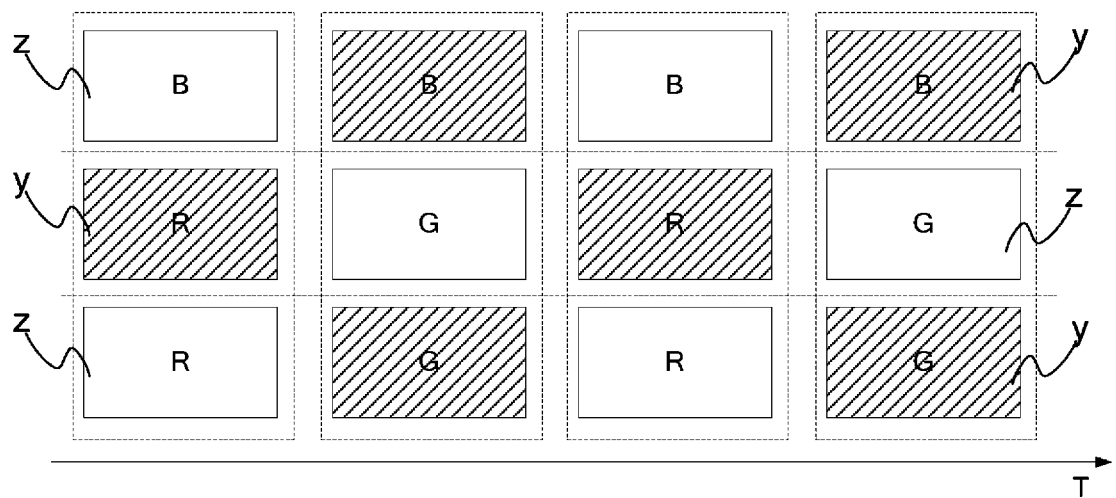
FIG. 7 is a time sequence diagram of images respectively entering the left eye Z and the right eye Y according to the first embodiment of the present disclosure.

In this embodiment, a time sequence diagram of a light ray entering a left eye Z and a light ray entering a right eye Y is shown in FIG. 7. The red light entering the left eye Z is at the same time sequence with the red light entering the right eye Y. The green light entering the left eye Z is at the same time sequence with the green light entering the right eye Y. The blue light entering the left eye Z is at the same time sequence with the red light or green light entering the left eye Z. Of course, they can be at different time sequences. As long as the time gaps between the blue light, the red light and the green light entering the same eye are small enough, an image frame may be synthesized due to the visual persistence effect of the human brain, and then, two image frames of the left and right eyes, of which wavelengths have a small difference therebetween, are synthesized into a stereoscopic image by the human brain.

In this technical solution, the controller 60 simultaneously controls color displays of the left-eye image and the right-eye image. In this case, in FIG. 7, R, G, and B light represented with oblique lines are used for displaying an image frame, and R, G and B light represented with blank regions are used for displaying another image frame. The lights represented with the oblique lines enters one eye, and the lights represented with the blank regions enters the other eye. In the technical solution according to this embodiment, in a time sequence, the left and right eyes can receive light at a same time point, thereby avoiding damage or fatigue to the eyes caused by frequent switching between brightness and darkness to the two eyes since light entered only one eye while no light entered the other eye at a same point in time.

In the stereoscopic image projection device according to this embodiment, the first broad spectrum light is split into the first wavelength light and the second wavelength light. The second broad spectrum light is split into the third wavelength light and the fourth wavelength light. The first wavelength light is controlled to display a corresponding color in the left-eye image while the second wavelength light is controlled to display a corresponding color in the right-eye image. The third wavelength light is controlled to display a corresponding color in the left-eye image while the fourth wavelength light is controlled to display a corresponding color in the right-eye image. In this case, at the same time, the left eye of the viewer can view the first wavelength light or the third wavelength light, the right eye of the viewer can view the second wavelength light or the fourth wavelength light. Therefore, the left and right eyes of the viewer can receive light rays simultaneously, thereby alleviating fatigue to the eyes.

Second Embodiment

Figure 8:
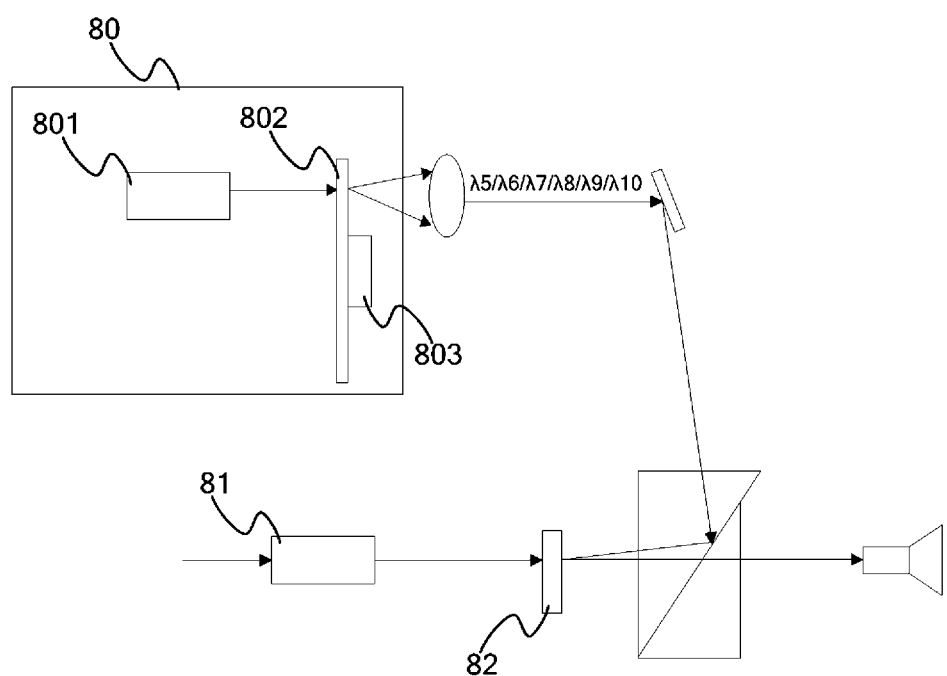
FIG. 8 is a schematic structural diagram of a stereoscopic image projection device according to a second embodiment of the present disclosure.

A stereoscopic image projection device is provided according to a second embodiment. As shown in FIG. 8, the stereoscopic image projection device includes a light source system 80, a controller 81 and a light modulator 82.

The light source system 80 is configured to sequentially generate a first wavelength light $\lambda 5$, a second wavelength light $\lambda 6$, a third wavelength light $\lambda 7$ and a fourth wavelength light $\lambda 8$. The first wavelength light $\lambda 5$ and the second wavelength light $\lambda 6$ have the same color and different wavelength ranges, for example, the first wavelength light $\lambda 5$ and the second wavelength light $\lambda 6$ may be blue light, red light or green light. The third wavelength light $\lambda 7$ and the fourth wavelength light $\lambda 8$ have the same color and different wavelength ranges, for example, the third wavelength light $\lambda 7$ and the fourth wavelength light $\lambda 8$ are yellow light, green light or red light. The controller 81 is configured to sequentially control the first wavelength light $\lambda 5$ to enter a left eye to display a corresponding color in a left-eye image, the second wavelength light $\lambda 6$ to enter a right eye to display a corresponding color in a right-eye image, the third wavelength light $\lambda 7$ to enter the left eye to display a corresponding color in the left-eye image, and the fourth wavelength light $\lambda 8$ to enter the right eye to display a corresponding color in the right-eye image. As compared with a method in which red light R, green light G and blue light B displaying corresponding colors in the left-eye image are controlled to enter the left eye, and then red light R, green light G and blue light B displaying corresponding colors in the right image are controlled to enter the right eye, the stereoscopic image projection device according to this embodiment can increase a switching frequency of the left and right eyes of the viewer to view light rays, thereby alleviating fatigue to the eyes of the viewer.

In the case that the first wavelength light $\lambda 5$ and the second wavelength light $\lambda 6$ are red lights and the third wavelength light $\lambda 7$ and the fourth wavelength light $\lambda 8$ are green lights, the light source system 80 is further configured to generate a fifth wavelength light $\lambda 9$ and a sixth wavelength light $\lambda 10$ which are blue light. In this case, the controller 81 is further configured to control the fifth wavelength light $\lambda 9$ to enter the left eye to display a corresponding color in the left-eye image and control the sixth wavelength light $\lambda 10$ to enter the right eye to display a corresponding color in the right-eye image. Therefore, the red light, green light and blue light to enter the left or right eye are transmitted to a subsequent light-combiner to compose white light for image display, based on the three primary color principle.

Specifically, the light source system 80 includes a solid-state light source 801 and a wavelength converter 802. The solid-state light source 801 includes at least one laser or light-emitting diode, for emitting excitation light. The wavelength converter 802 includes at least six light-emitting regions, in each of which a wavelength conversion material, i.e., phosphor, is provided. The wavelength converter 802 is configured to rotate when driven by a driver 803 such that the light-emitting regions are sequentially arranged on a light path of the excitation light to absorb the excitation light and sequentially generate the first wavelength light $\lambda 5$, the second wavelength light $\lambda 6$, the third wavelength light $\lambda 7$, the fourth wavelength light $\lambda 8$, the fifth wavelength light $\lambda 9$ and the sixth wavelength light $\lambda 10$.

Figure 9:
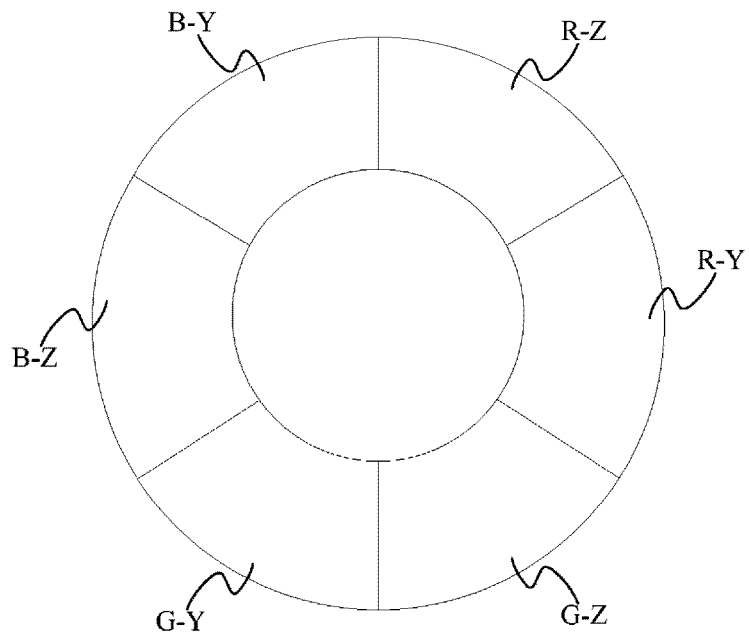
FIG. 9 is a distribution diagram of light-emitting regions of a wavelength converter according to the second embodiment of the present disclosure.

A distribution of the light-emitting regions of the wavelength converter 802 is shown in FIG. 9. In a case that the wavelength converter 802 is rotated clockwise, light-emitting regions R-Z absorb the excitation light to generate the first wavelength light $\lambda 5$, i.e., red light $\lambda 5$, to enter the left eye, light-emitting regions R-Y absorb the excitation light to generate the second wavelength light $\lambda 6$, i.e., red light $\lambda 6$, to enter the right eye, light-emitting regions G-Z absorb the excitation light to generate the third wavelength light $\lambda 7$, i.e., green light $\lambda 7$, to enter the left eye, light-emitting regions G-Y absorb the excitation light to generate the fourth wavelength light $\lambda 8$, i.e., green light $\lambda 8$, to enter the right eye, light-emitting regions B-Z absorb the excitation light to generate the fifth wavelength light $\lambda 9$, i.e., blue light $\lambda 9$, to enter the left eye, and light-emitting regions B-Y absorb the excitation light to generate the sixth wavelength light $\lambda 10$, i.e., blue light $\lambda 10$, to enter the right eye.

The first wavelength light $\lambda 5$ to the sixth wavelength light $\lambda 10$ generated by the light source system 80 need to be modulated by the light modulator such that different light can have different gray-levels, thereby controlling overall brightness of the left-eye image to enter the left eye and the right-eye image to enter the right eye. In the embodiment, only one light modulator 72 is provided.

Figure 10:
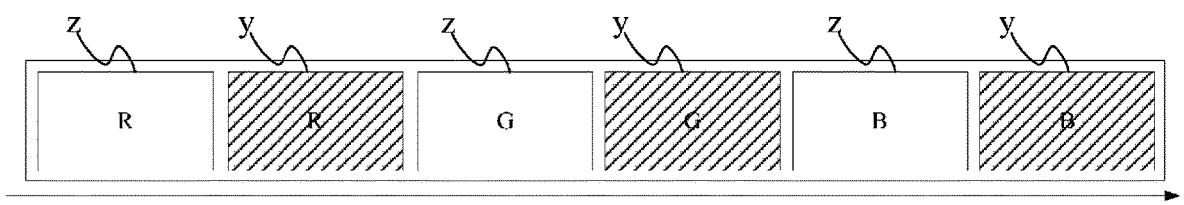
FIG. 10 is a time sequence diagram of images respectively entering the left eye Z and the right eye Y according to the second embodiment of the present disclosure.

In the embodiment, a time sequence diagram of an image entering a left eye Z and an image entering a right eye Y is shown in FIG. 10. The controller 81 sequentially controls the red light λ5 displaying the corresponding color in the left-eye image to enter the left eye Z, the red light λ6 displaying the corresponding color in the right-eye image to enter the right eye Y, the green light λ7 displaying the corresponding color in the left-eye image to enter the left eye Z, the green light λ8 displaying the corresponding color in the right-eye image to enter the right eye Y, the blue light λ9 displaying the corresponding color in the left-eye image to enter the left eye Z, and the blue light λ10 displaying the corresponding color in the right-eye image to enter the right eye Y. Small wavelength differences exist between the red light λ5 and the red light λ6, the green light λ7 and the green light λ8, and the blue light λ9 and the blue light λ10, and the wavelength differences can be achieved with different types of phosphors. Therefore, the viewer can view a stereoscopic image synthesized by the human brain.

The stereoscopic image projection device according to this embodiment sequentially generates a red light to enter the left eye, a red light to enter the right eye, a green light to enter the left eye, a green light to enter the right eye, a blue light to enter the left eye and a blue light to enter the right eye; and sequentially controls the red light displaying the corresponding color in the left-eye image to enter the left eye, the red light displaying the corresponding color in the right-eye image to enter the right eye, the green light displaying the corresponding color in the left-eye image to enter the left eye, the green light displaying the corresponding color in the right-eye image to enter the right eye, the blue light displaying the corresponding color in the left-eye image to enter the left eye and the blue light displaying the corresponding color in the right-eye image to enter the right eye, thereby increasing the switching frequency between left and right eyes to view light, and thus alleviating fatigue to the eyes.

Third Embodiment

A stereoscopic image projection device according to a third embodiment is substantially the same as the stereoscopic image projection device according to the second embodiment, except that, in this embodiment, phosphors provided in the respective light-emitting regions in the wavelength converter are different, and lights sequentially generated are also different.

Figure 11:
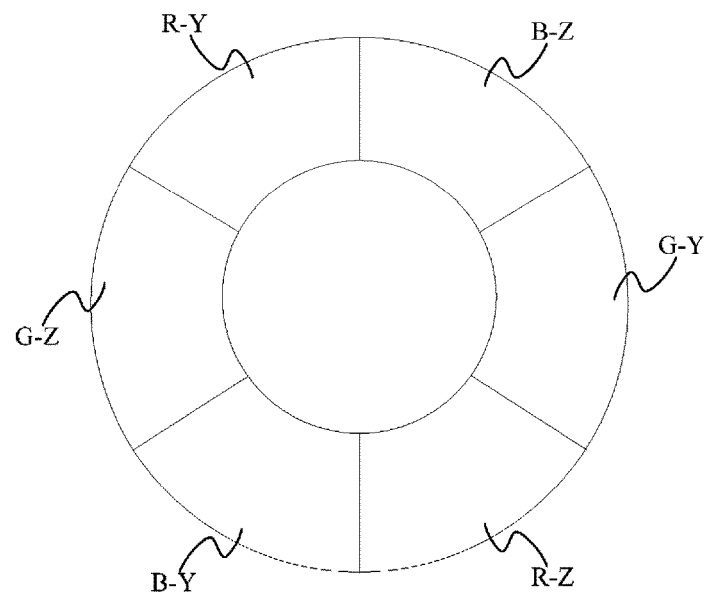
FIG. 11 is a distribution diagram of light-emitting regions of a wavelength converter according to a third embodiment of the present disclosure.

A distribution of the light-emitting regions of the wavelength converter according to the embodiment is shown in FIG. 11. In a case that the wavelength converter is rotated clockwise, light-emitting regions B to Z absorb excitation light to generate a first wavelength light λ5, i.e., blue light λ5, to enter the left eye, light-emitting regions G-Y absorb the excitation light to generate a second wavelength light λ6, i.e., green light λ6, to enter the right eye, light-emitting regions R-Z absorb the excitation light to generate a third wavelength light λ7, i.e., red light λ7, to enter the left eye, light-emitting regions B-Y absorb the excitation light to generate a fourth wavelength light λ8, i.e., blue light λ8, to enter the right eye, light-emitting regions G-Z absorb the excitation light to generate a fifth wavelength light λ9, i.e., green light λ9, to enter the left eye, and light-emitting regions R-Y absorb the excitation light to generate a sixth wavelength light λ10, i.e., red light λ10, to enter the right eye.

Figure 12:
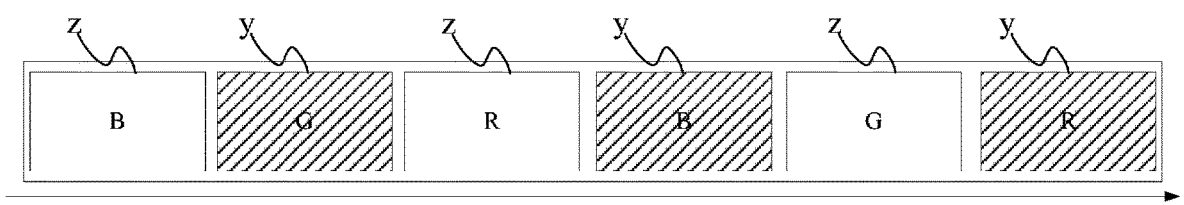
FIG. 12 is a time sequence diagram of images respectively entering the left eye Z and the right eye Y according to the third embodiment of the present disclosure.

The first wavelength light to the sixth wavelength light are modulated by the light modulator. A time sequence diagram of an image entering a left eye Z and an image entering the right eye Y is shown in FIG. 12. The controller sequentially controls the blue light λ5 displaying the corresponding color in the left-eye image to enter the left eye Z, the green light λ6 displaying the corresponding color in the right-eye image to enter the right eye Y, the red light λ7 displaying the corresponding color in the left-eye image to enter the left eye Z, the blue light λ8 displaying the corresponding color in the right-eye image to enter the right eye Y, the green light λ9 displaying the corresponding color in the left-eye image to enter the left eye Z, and the red light λ10 displaying the corresponding color in the right-eye image to enter the right eye Y. Small wavelength differences exist between the red light λ5 and the red light λ6, the green light λ7 and the green light λ8, and the blue light λ9 and the blue light λ10, and the wavelength differences can be achieved with different types of phosphors. Therefore, the viewer can view a stereoscopic image synthesized by the human brain.

The stereoscopic image projection device according to this embodiment sequentially generates the blue light to enter the left eye, the green light to enter the right eye, the red light to enter the left eye, the blue light to enter the right eye, the green light to enter the left eye and the red light to enter the right eye; and sequentially controls the blue light displaying the corresponding color in the left-eye image to enter the left eye, the green light displaying the corresponding color in the right-eye image to enter the right eye, the red light displaying the corresponding color in the left-eye image to enter the left eye, the blue light displaying the corresponding color in the right-eye image to enter the right eye, the green light displaying the corresponding color in the left-eye image to enter the left eye and the red light displaying the corresponding color in the right-eye image to enter the right eye, thereby increasing the switching frequency between left and right eyes to view light, and thus alleviating fatigue to the eyes.

Fourth Embodiment

A fourth embodiment provides a stereoscopic display glasses for displaying an image projected by the stereoscopic image projection device according to any one of the above embodiments. The glasses include a first lens corresponding to the left eye of a viewer and a second lens corresponding to the right eye of the viewer. The first lens can transmit a light which is to enter the left eye while reflecting a light which is not to enter the left eye, and the second lens can transmit a light which is to enter the left eye while reflecting a light which is not to enter the right eye. The first lens and the second lens can simultaneously transmit light or sequentially transmit light, thereby alleviating fatigue to the eyes of a viewer viewing a stereoscopic image.

Various embodiments in the specification are described in a progressive way, as each embodiment lays emphasis on the differences from the other embodiments, and for the same or similar parts between various embodiments, one may refer to the description of other embodiments.

With the above descriptions of the disclosed embodiments, those skilled in the art may practice or use the present disclosure. Various modifications to the embodiments are apparent for the skilled in the art. The general principle suggested herein can be implemented in other embodiments without departing from the spirit or scope of the disclosure. Therefore, the present disclosure should not be limited to the embodiments disclosed herein, but has the widest scope that is in conformity with the principle and the novel features disclosed herein.

The invention claimed is:

1. A stereoscopic image projection device, comprising:
a light source system configured to sequentially generate a first broad spectrum light and a second broad spectrum light;
a light splitter configured to split the first broad spectrum light into a first wavelength light and a second wavelength light, each having different wavelengths, and split the second broad spectrum light into a third wavelength light and a fourth wavelength light, each having different wavelengths;
a light modulator that includes a second light modulator and a third light modulator, wherein the second light modulator is configured to sequentially modulate the first wavelength light and the third wavelength light, and the third light modulator is configured to sequentially modulate the second wavelength light and the fourth wavelength light; and
a controller configured to simultaneously control the second light modulator and the third light modulator such that:
in a first time period, the second light modulator modulates the first wavelength light so as to display a corresponding color in a left-eye image and the third light modulator modulates the second wavelength light so as to display a corresponding color in a right-eye image, wherein the corresponding color in the right-eye image is displayed at approximately the same time when the corresponding color in the left-eye image is displayed, and
in a second time period, the second light modulator modulates the third wavelength light so as to display a corresponding color in the left-eye image and the third light modulator modulates the fourth wavelength light so as to display a corresponding color in the right-eye image, wherein the corresponding color in the right-eye image again is displayed at approximately the same time when the corresponding color in the left-eye image is displayed.

2. The stereoscopic image projection device according to claim 1, wherein the first wavelength light and the second wavelength light have the same color and different wavelength ranges, and the third wavelength light and the fourth wavelength light have the same color and different wavelength ranges.

3. The stereoscopic image projection device according to claim 2, wherein the light source system comprises a solid-state light source and a wavelength converter, and wherein:
the solid-state light source comprises a first light source configured to emit excitation light; and
the wavelength converter includes at least two light-emitting regions in each of which a wavelength conversion material is provided, the light-emitting regions being sequentially arranged on a light path of the excitation light to absorb the excitation light and sequentially generate the first broad spectrum light and the second broad spectrum light.

4. The stereoscopic image projection device according to claim 3, wherein the light source system further comprises a second light source configured to emit a fifth wavelength light and a third light source configured to emit a sixth wavelength light, wherein the fifth wavelength light and the sixth wavelength light have the same color and different wavelength ranges.

5. The stereoscopic image projection device according to claim 4, wherein:
the light modulator further includes a first light modulator configured to sequentially modulate the fifth wavelength light and the sixth wavelength light; and
the controller is further configured to simultaneously control the first light modulator, the second light modulator, and the third light modulator such that:
in the first time period, the first light modulator modulates the fifth wavelength light and the second light modulator modulates the first wavelength light so as to display a corresponding color in the left-eye image, and the third light modulator modulates the second wavelength light so as to display a corresponding color in the right-eye image at approximately the same time as the left-eye image, and
in the second time period, the first light modulator modulates the sixth wavelength light and the second light modulator modulates the third wavelength light so as to display a corresponding color in the left-eye image, and the third light modulator modulates the fourth wavelength light so as to display a corresponding color in the right-eye image at approximately the same time as the left-eye image.

6. The stereoscopic image projection device according to claim 5, wherein the light splitter comprises a first prism, a second prism and a third prism, wherein a first film layer is arranged on an interface between the first prism and the second prism to sequentially transmit the fifth wavelength light or the sixth wavelength light to a respective light modulator, and a second film layer is arranged on an interface between the second prism and the third prism to split the first broad spectrum light into the first wavelength light and the second wavelength light, each having different wavelengths, split the second broad spectrum light into the third wavelength light and the fourth wavelength light, each having different wavelengths, and transmit the first wavelength light, the second wavelength light, the third wavelength light and the fourth wavelength light to respective light modulators.

7. The stereoscopic image projection device according to claim 6, wherein the light modulator comprises a first light modulator, a second light modulator and a third light modulator, and wherein:
the first light modulator is configured to sequentially modulate the fifth wavelength light and the sixth wavelength light;
the second light modulator is configured to sequentially modulate the first wavelength light and the third wavelength light; and
the third light modulator is configured to sequentially modulate the second wavelength light and the fourth wavelength light.

8. The stereoscopic image projection device according to claim 7, wherein the first broad spectrum light is a red light, the second broad spectrum light is a green light, and the fifth wavelength light and the sixth wavelength light are blue lights.

9. A stereoscopic image projection device, comprising:
a light source system configured to sequentially generate a first wavelength light to enter a left eye, a second wavelength light to enter a right eye, a third wavelength light to enter the left eye, and a fourth wavelength light to enter the right eye;
a light modulator configured to sequentially modulate the first wavelength light, the second wavelength light, the third wavelength light, and the fourth wavelength; and a controller configured to sequentially control the first wavelength light to display a corresponding color in a left-eye image and the second wavelength light to display a corresponding color in a right-eye image, and then sequentially control the third wavelength light to display a corresponding color in the left-eye image and the fourth wavelength light to display a corresponding color in the right-eye image, wherein the first wavelength light and the third wavelength light are used for displaying an image frame, and the second wavelength light and the fourth wavelength light are used for displaying another image frame.

10. The stereoscopic image projection device according to claim 9, wherein the light source system is further configured to generate a fifth wavelength light and a sixth wavelength light.

11. The stereoscopic image projection device according to claim 10, wherein the controller is further configured to sequentially control the fifth wavelength light to display a corresponding color in the left-eye image that is displayed to the left eye and the sixth wavelength light to display a corresponding color in the right-eye image that is displayed to the right eye.

12. The stereoscopic image projection device according to claim 11, wherein the light modulator is further configured to sequentially modulate the first wavelength light, the second wavelength light, the third wavelength light, the fourth wavelength light, the fifth wavelength light, and the sixth wavelength light.

13. The stereoscopic image projection device according to claim 12, wherein the light source system comprises a solid-state light source and a wavelength converter, wherein the solid-state light source is configured to emit an excitation light, and the wavelength converter comprises at least six light-emitting regions in each of which a wavelength conversion material is provided, the light-emitting regions being sequentially arranged on a light path of the excitation light to absorb the excitation light and sequentially generate the first wavelength light, the second wavelength light, the third wavelength light, the fourth wavelength light, the fifth wavelength light and the sixth wavelength light.

14. The stereoscopic image projection device according to claim 13, wherein the first wavelength light and the second wavelength light have the same color and different wavelength ranges, the third wavelength light and the fourth wavelength light have the same color and different wavelength ranges, and the fifth wavelength light and the sixth wavelength light have the same color and different wavelength ranges.

15. The stereoscopic image projection device according to claim 13, wherein the first wavelength light and the fourth wavelength light have the same color and different wavelength ranges, the second wavelength light and the fifth wavelength light have the same color and different wavelength ranges, and the third wavelength light and the sixth wavelength light have the same color and different wavelength ranges.

16. The stereoscopic image projection device according to claim 12, wherein the light source system comprises a solid-state light source and a color wheel, wherein the color wheel comprises at least six regions, at least three of which are configured to transmit P light and at least three of which are configured to transmit S light, the P light containing three primary colors and the S light containing three primary colors.

17. Stereoscopic display glasses, wherein the stereoscopic display glasses are configured to display a stereoscopic image projected by the stereoscopic image projection device according to claim 1.

18. Stereoscopic display glasses, wherein the stereoscopic display glasses are configured to display a stereoscopic image projected by the stereoscopic image projection device according to claim 9.

19. The stereoscopic image projection device according to claim 12, wherein the first wavelength light, the third wavelength light, and the fifth wavelength light are used for displaying an image frame, and the second wavelength light, the fourth wavelength light, and the sixth wavelength light are used for displaying another image frame.

* * * * *